(12) United States Patent
Kawahigashi

(10) Patent No.: US 7,965,720 B2
(45) Date of Patent: Jun. 21, 2011

(54) METHOD OF SELECTING NETWORK PATH AND COMMUNICATION SYSTEM

(75) Inventor: Haruko Kawahigashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 12/271,197

(22) Filed: Nov. 14, 2008

(65) Prior Publication Data

US 2009/0290588 A1     Nov. 26, 2009

(30) Foreign Application Priority Data

May 22, 2008   (JP) ................................. 2008-134826

(51) Int. Cl.
*H04L 12/56*   (2006.01)
(52) U.S. Cl. ................ 370/400; 370/252; 370/254
(58) Field of Classification Search ................. 370/216, 370/252, 254, 238
See application file for complete search history.

(56) References Cited

U.S. PATENT DOCUMENTS

| | | | | |
|---|---|---|---|---|
| 7,626,945 | B1 * | 12/2009 | Klincewicz et al. | 370/254 |
| 2003/0227877 | A1 * | 12/2003 | Kar et al. | 370/252 |

FOREIGN PATENT DOCUMENTS

JP        2006-31693         2/2006

OTHER PUBLICATIONS

Jing Wang, et al., "An Algorithm to Search Minimal Subtree Graphs", International Conference on Parallel Processing Workshops, IEEE, XP031144982, Sep. 1, 2007, 6 pages.
"Compatible Systems Setup Guides: OSPF Configuration Guide", Cisco Systems, XP-002537785, Dec. 8, 2004, pp. 1-15.
Christina Fragouli, et al., "Information Flow Decomposition for Network Coding", IEEE Transations on Information Theory, vol. 52, No. 3, XP-002537786, Mar. 2006, pp. 829-848.
Rudolf Ahlswede, et al., "Network Information Flow", IEEE Transactions on Information Theory, vol. 46, No. 4, Jul. 2000, pp. 1204-1216.
Shuo-Yen Robert Li, et al., "Linear Network Coding", IEEE Transactions on Information Theory, vol. 49, No. 2, Feb. 2003, pp. 371-381.
Miki Yamamoto, "Network Coding", The Institute of Electronics, Information and Communication Engieers (IEICE), vol. 90, No. 2, Feb. 2007, 20 pages (with English Abstract).
Tracey Ho, et al., "A Random Linear Network Coding Approach to Multicast", IEEE Transactions on Information Theory, vol. 52, No. 10, Oct. 2006, pp. 4413-4430.
Joon-Sang Park, et al., "Code-Cast: A Network-Coding-Based Ad Hoc Multicast Protocol", IEEE Wireless Communications, vol. 13, No. 5, Oct. 2006, pp. 76-81.
Tracey Ho, et al., "Network Coding", Cambridge University Press, May 2008, 15 pages.
Toshihide Ibaraki, et al., "Method of Optimization", Information mathematics course, vol. 14, Kyoritsu Shuppan Co., Ltd., Jul. 20, 1993, 23 pages (with English Abstract).

* cited by examiner

*Primary Examiner* — Man Phan
*Assistant Examiner* — Mohamed Kamara
(74) *Attorney, Agent, or Firm* — Oblon, Spivak, McClelland, Maier & Neustadt, L.L.P.

(57) ABSTRACT

A method of selecting a network path for a network coding communication includes initializing a length of each of links; searching for an independent path from a source node to one of target nodes based on the length of each of the links; multiplying a predetermined factor to the length of each of the links used in the independent path; repeating the searching and the multiplying for all the target nodes; extracting the links and the nodes used in the independent path; generating a subgraph with the links and the nodes extracted at the extracting; and selecting the network path based on the subgraph.

7 Claims, 3 Drawing Sheets

METHOD OF SELECTING NETWORK PATH AND COMMUNICATION SYSTEM

BACKGROUND OF THE INVENTION

1. Field of the Invention

The present invention relates to a method of selecting a network path and a communication system.

2. Description of the Related Art

When sending data from a source to a destination in a network that connects communication devices (hereinafter, "nodes") and communication paths (hereinafter, "links"), each node performs a switching process of outputting input data to a desired destination in a conventional packet communication. In the packet switching process, only packet sorting into the destinations is performed, and no process is performed on user data in the packet. By contrast, a recent noticeable network coding technology has enabled each node to perform coding in addition to the switching process, so that network-wide efficient transmission is attained.

A first feature of the network coding is streamlining of transmission, i.e., effective utilization of communication resources such as band frequencies. The conventional network coding technologies for wide and effective communication to a plurality of destinations are disclosed in Japanese Patent Application Laid-open No. 2006-31693; R. Ahlswede et al., "Network Information Flow", IEEE tran. on Information Theory, vol. 46, No. 4, July, 2000, pages 1204 to 1216; Miki Yamamoto, "Network Coding", The Journal of the Institute of Electronics, Information, and Communication Engineers, vol. 90, No. 2, February, 2007, pages 111 to 116; S-Y. R. Li et al., "Linear Network Coding" vol. 49, No. 2, February, 2003, pages 371 to 381; T. Ho, M. Medard, R. Koetter, D. R. Karger, M. Effros, B Leong, "A Random Linear Network Coding Approach to Multicast", IEEE Transactions, Information Theory, Vol. 52, No. 10, Pages 4413 to 4430, October, 2006.; J.-S. Park, M Gerla, D. S. Lun, Y. Yi, M. Medard, "Code-Cast: A Network-Coding-Based Ad Hoc Multicast Protocol", IEEE Wireless Communication Vol. 13, No. 5, October, 2006, pages 76 to 81.

The conventional network coding technologies offer methods for efficiently transmitting date to a plurality of destinations; however consideration is not given to surely transmitting data to specific destinations and reducing the risk of possible interception that can be prevented by avoiding unnecessary communication. Therefore, data deliveries to designated destinations are not ensured and possibility of the interception is not reduced.

The above documents "A Random Linear Network Coding Approach to Multicast" and "Code-Cast: A Network-Coding-Based Ad Hoc Multicast Protocol" disclose technologies in which each node selects the coding methodology at random, and selects and transmits information. If the processing fails, the packet is discarded. Thus, consideration is not given to the surely transmitting of information and the avoiding of the unnecessary communication.

SUMMARY OF THE INVENTION

It is an object of the present invention to at least partially solve the problems in the conventional technology.

According to an aspect of the present invention, there is provided a method of selecting a network path for a network coding communication using a network model that includes nodes including at least one source node that transmits data and at least two target nodes that receive the data from the source node and links between the nodes, the method includes initializing a length of each of the links to a predetermined value; searching for an independent path from the source node to one of the target nodes based on the length of each of the links; multiplying a predetermined factor to the length of each of the links used in the independent path that is obtained at the searching; repeating the searching and the multiplying until the searching and the multiplying are performed on all the target nodes; extracting the links and the nodes that are used in the independent path; generating a subgraph with the links and the nodes extracted at the extracting; and selecting the network path based on the subgraph.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
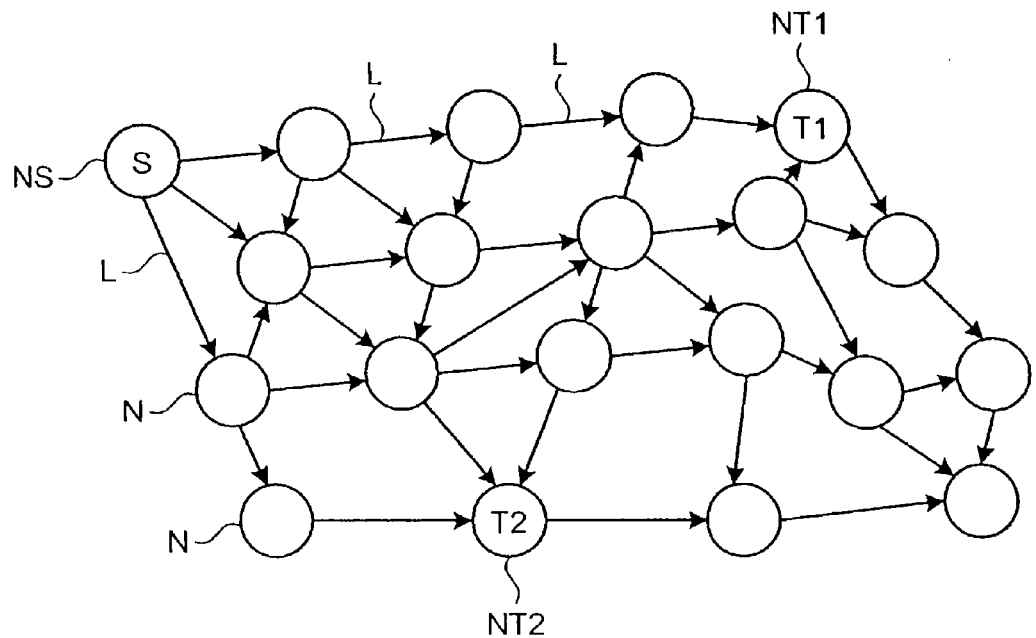
FIG. 1 is a schematic diagram of an exemplary network model of a communication system according to an embodiment of the present invention.

FIG. 1 is a schematic diagram of an exemplary network model of a communication system according to an embodiment of the present invention. A network communication method according to the present embodiment is explained below referring to the network model shown in FIG. 1. The network model includes a plurality of nodes N that represents communication devices and a plurality of links L that represents communication paths between the nodes N. The links L have directional components and thereby being directed in directions indicated by arrows shown in FIG. 1. The present embodiment is based on the assumption that the nodes N are connected to one another with the directed links L in a network.

As shown in FIG. 1, one of the nodes N is a source node NS as a data source, and one or more of the nodes N are target nodes NT as a data destination. In the example shown in FIG. 1, two target nodes NT1 and NT2 are provided.

For realizing efficient communication using a network coding technology, independent paths from the source node NS to the target nodes NT in the network model are important factor. The independent path is a path from the single source node NS to a single target node NTi ("i" is an identifier of the target node) and does not share any link L with other paths but can share nodes with other paths.

In the document by S-Y. R. Li et al., of "Linear Network Coding" vol. 49, No. 2, February, 2003, pages 371 to 381, it is theoretically described that the number of the independent paths from the source node NS to the target node NT is equivalent to an upper limit of an efficient communication in the network model exemplified in FIG. 1 in the network coding technology. Thus, assuring the independent paths from the source node NS to the target node NT are a key for an efficient communication.

Figure 2:
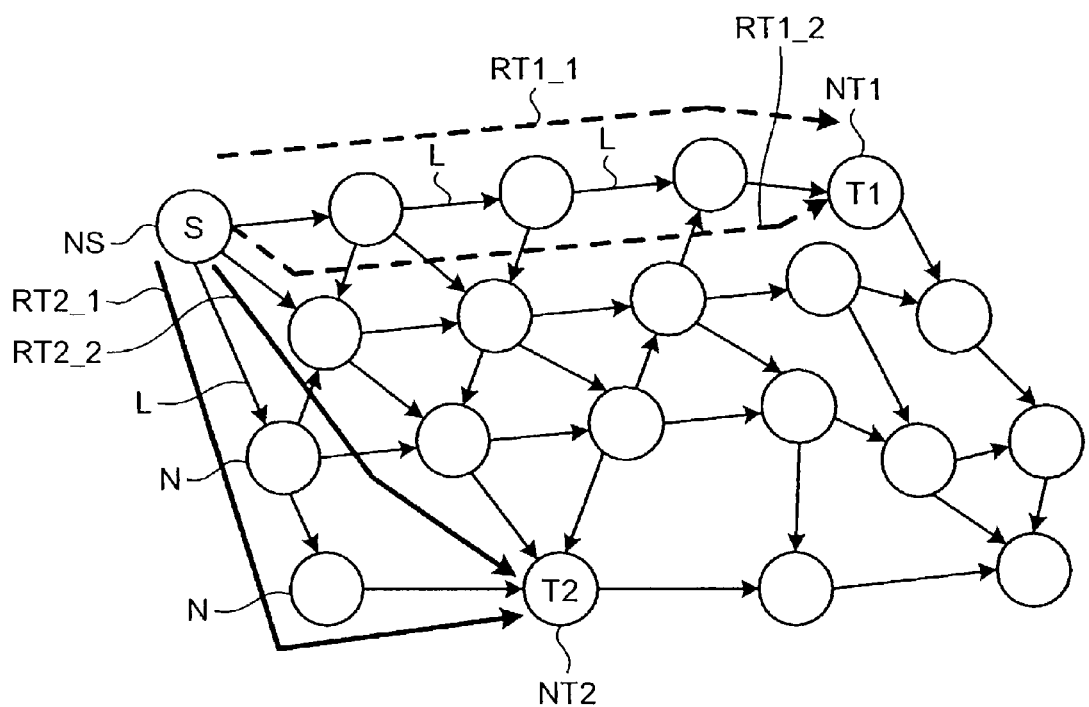
FIG. 2 is a schematic diagram for explaining exemplary independent paths of the network model shown in FIG. 1.

FIG. 2 is a schematic diagram of independent paths of the network model shown in FIG. 1. As one example of independent paths from the source node NS as a start point to the target node NT1 as a destination, two independent paths RT1_1 and RT1_2 are shown. As another example of independent paths from the source node NS to the target node NT2, two independent paths RT2_1 and RT2_2 are shown.

There are numerous links L that are not used for the independent paths RT1_1, RT1_2, RT2_1, and RT2_2. In other words, the network has a number of unused links L that do not form the independent paths. Communication from the NS to the target node NT1 and from the source node NS to the target node NT2 only employs the independent paths that are set before determination of network coding methodologies such as concrete contents of coding or calculations performed by each node. Because links and nodes that are not on the independent paths are not used, such links and nodes can be eliminated from the network model before the determinations of the network coding methodologies. The elimination of the links and the nodes does not influence efficient network communication and is even beneficial in improving a communication efficiency by eliminating communication resource for maintenance of redundant nodes and links.

Furthermore, the elimination of redundant nodes and links facilitates determination of coding methodologies. Moreover, even if the network model contains a loop that causes a circulation along directions of the links from an original source node to be returned to the original source node, elimination of the redundant nodes and links can cut off the loop.

Figure 3:
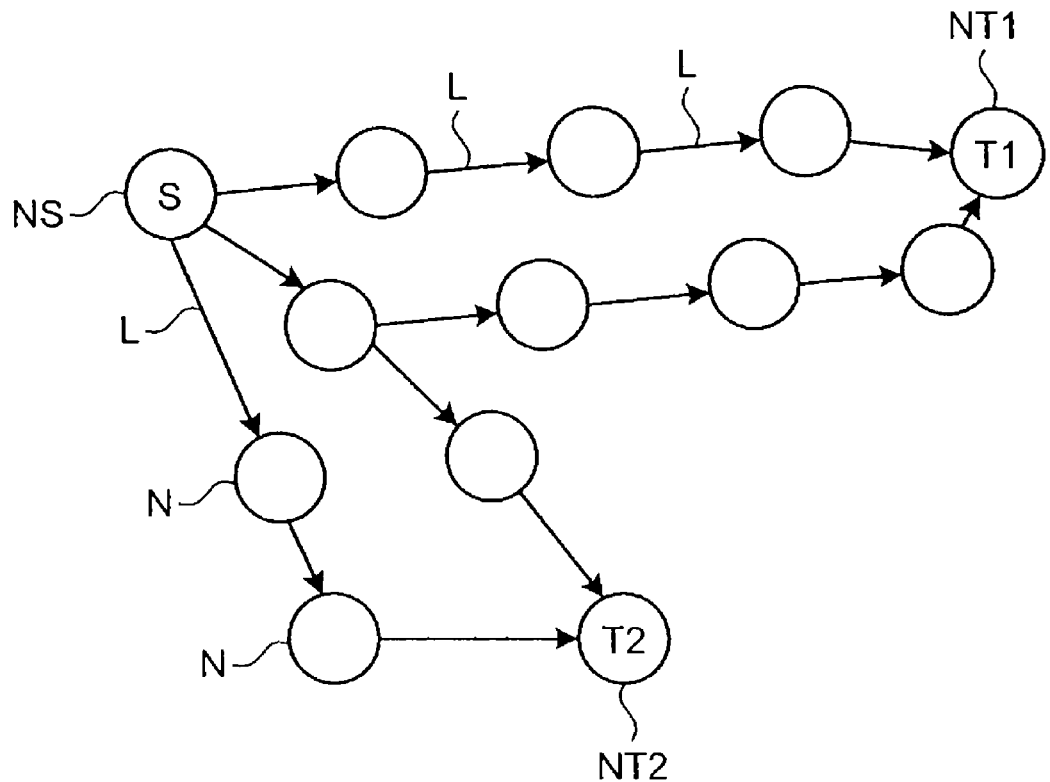
FIG. 3 is a schematic diagram of an exemplary subgraph according to the embodiment.

In the present embodiment, the network model in which the redundant nodes and links are eliminated from the original network is referred to as a "subgraph". FIG. 3 is a schematic diagram of the exemplary subgraph. The subgraph is a subset graph (a partial network model) of an original graph (the network model shown in FIG. 1) and contains part of the nodes N and the links L of the original graph. The effective subgraph is one that does not include nodes and links that are redundant and does not contribute to forming the independent paths. The subgraph in FIG. 3 is the subset after nodes N and links L that are not used in the independent paths RT1_1, RT1_2, RT2_1, and RT2_2 shown in FIG. 2 are eliminated from the original network shown in FIGS. 1 and 2.

Independent paths to the same target node do not share any link. However, independent paths to different target nodes can share the same link. In how many independent paths a single link is used is referred to as "link utilization rate". A higher link utilization rate means that communication is performed efficiency by effectively using resources. Therefore, according to the present embodiment, the independent paths are selected to increase the link utilization rate.

Figure 4:
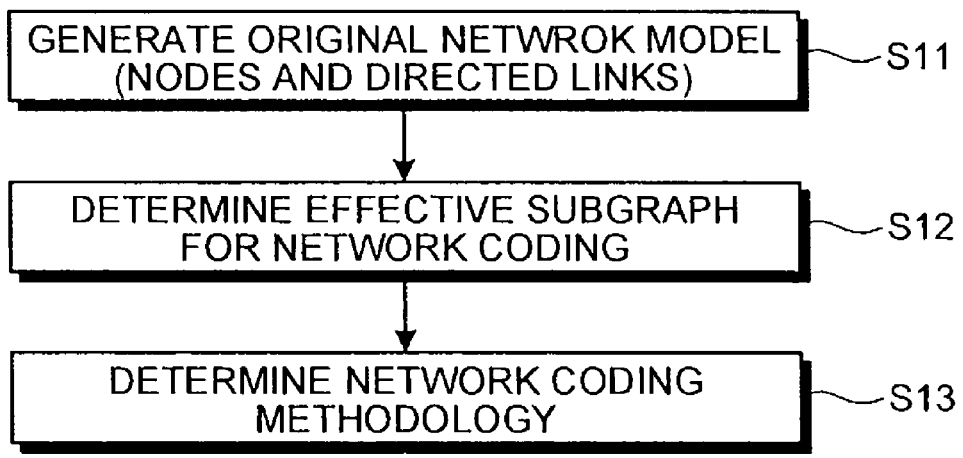
FIG. 4 is a flowchart of a procedure of a network coding designing method according to the embodiment.

A network path selecting process according to the present embodiment is explained below. FIG. 4 is a flowchart of a procedure of a network coding designing method including the network path selecting process. A source node and a target node are determined to generate an original network model (Step S11). In the present embodiment, the network model is the one shown in FIG. 1 and includes the nodes and the directed links. The network model is generated by the same method as that in the conventional network coding.

An effective subgraph is determined for the network coding in accordance with the network path selecting process described later (Step S12). Based on the subgraph determined in Step S12, the network coding methodology is determined (Step S13), in which a matrix to be multiplied to an input signal at each node N to obtain an output signal is specifically determined, and more specifically, methodologies of the network coding and calculations are determined. The methodology of the network coding is determined in the same manner as that in the conventional network technology. The conventional network technology does not employ Step S12. In the present embodiment, Step S13 can effectively be performed by performing Step S12 between Step S11 and Step S13.

Figure 5:
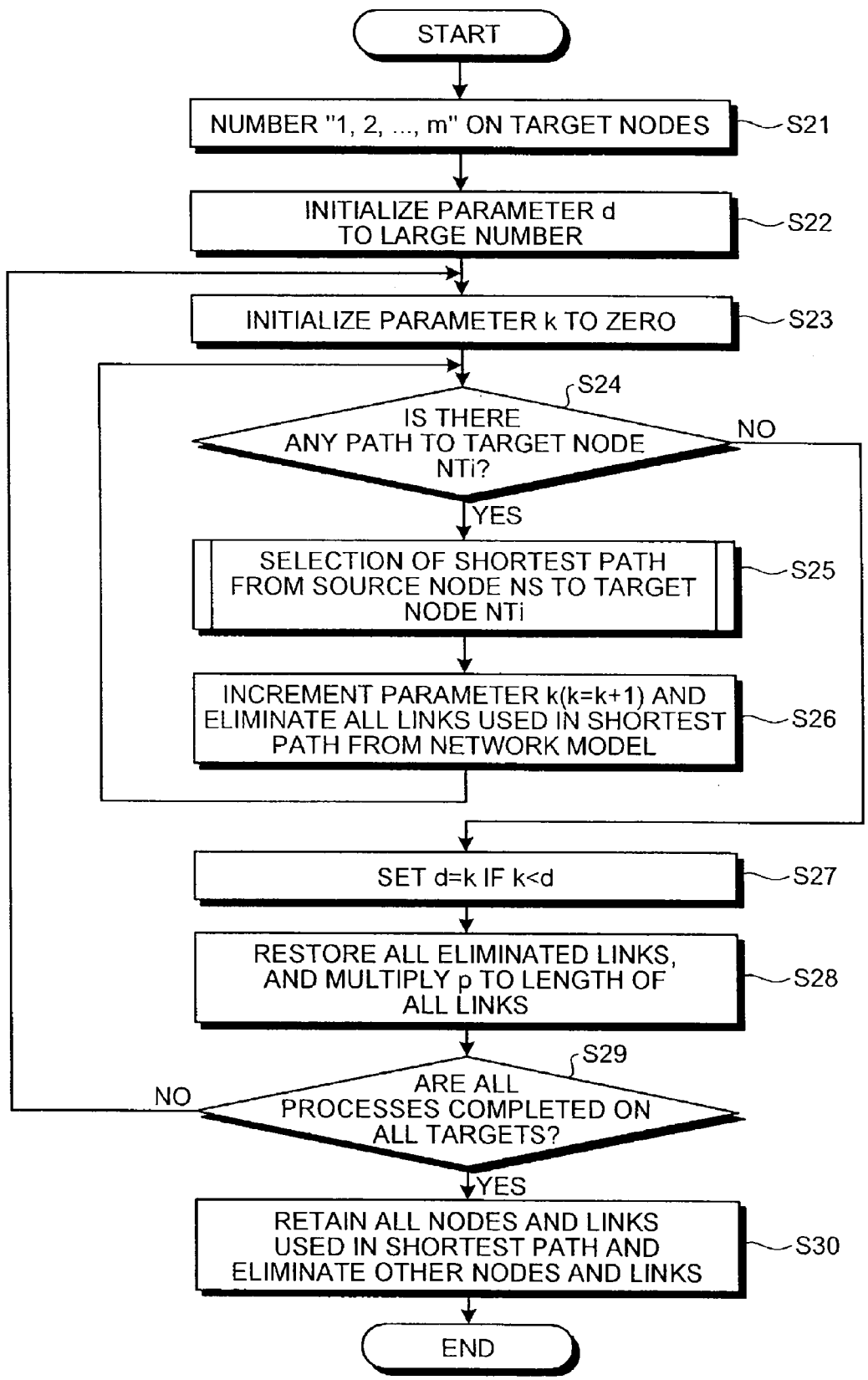
FIG. 5 is a flowchart of a procedure of a network path selecting process according to the embodiment.

FIG. 5 is a flowchart of a procedure of the network path selecting process. The network path selecting process can be performed by a node such as the source node NS or a network-controlling node, or it can be performed in advance by a calculator as a separate function from the network.

A length of each link is initialized to one. Numbering of "1, 2, ..., m (where m is the number of the nodes)" is conducted on the target nodes NT1, NT2, ..., NTi (Step S21). The variable d is set to an initial value of a large number. The variable d is used for obtaining the minimum number of the independent paths to each of the target nodes (Step S22). The large initial value can be a number larger than the number of the presumable independent paths to each of the target nodes.

Processes from Steps S23 to S29 are performed for each of the target nodes NTi (i=1 to m). The i-th processes from Steps S23 to S29 are performed to the i-th target node. Parameter k is set to zero by default (Step S23). The parameter k is used as a counter for counting the number of the independent paths per target node. It is determined whether there is a path from the source node NS to the target node NTi corresponding to the number "i" assigned at Step S21 (Step S24). Specifically, when the i-th process at Step S24 is performed, it is determined whether there is a path to the target node NTi corresponding to the number "i".

If there is a path to the target node NTi (YES at Step S24), a shortest path to the target node NTi from the NS is selected (Step S25). For example, Dijkstra Method is employed for selecting the shortest path. The Dijkstra Method is disclosed in Toshihide Ibaraki, Masao Fukushima, "Optimization Method", Kyoritsu Shuppan Co., Ltd., 1993, pages 43 to 44. The methodologies of selecting the shortest path are not limited to the Dijkstra Method, and other known methods can also be employed. The selection of the shortest path is not necessarily precise in the path length and an algorism that selects a roughly shortest path can be used.

The parameter k is incremented by one (k=k+1), and then the links that are selected to be used for the shortest path at Step S25 are eliminated from the network model (Step S26), and system control returns to Step S24. In the network model subjected to the link elimination at Step S26, if the k=1, the network model is equivalent to the original network model generated at Step S11. If the k≧2, the network model subjected to the link elimination at Step S26 is a network model after subjected to the link elimination by the (k−1)-th process at Step S26.

In the process at Step S24 where k≧2 (the second or the subsequent processing on the same target node), it is determined whether there is a path from the source node NS to the target node NTi for the network model after the link elimination by the (k−1)-th process at Step S26.

If it is determined that a path from the source node NS to the target node NTi is not present (NO at Step S24), the parameter d is reset to d=k in the case where k<d (Step S27). If other than k<d, the parameter d is not changed. All the links eliminated at Step S26 are restored to the original network model that is generated at Step 11 and a length of each of the eliminated links is multiplied by a weighting factor p ($0 \leq p \leq 1$) when restoring the eliminated links (Step S28).

Then, it is determined whether all the processes from Steps S23 to S28 for all the target nodes have been completed (Step S29). If the processes are not completed (NO at Step S29), the system control returns to Step S23 and subsequent processes are performed for unprocessed target node. If the processes are completed (YES at Step S29), all the links used in the shortest path in the network model generated at Step S11 are retained and all the unused nodes and links are eliminated (Step S30), and then the processes end.

The subgraph according to the present embodiment includes only the links and nodes retained in the above manner. The k shortest paths that are eliminated at Step S26 for each target node is the number of the independent paths to the target node. The final value of the variable d at the end of the network path selecting process is the minimum number of the independent paths to each of the target nodes. Based on a typical network coding theory, d-dimensional data can be transmitted from a source node NS to the target nodes NTi (i=1 to m) through a single transmission.

According to the present embodiment of the present invention, utilization of one link for a plurality of paths is considered as desirable. High link utilization rate reduces the number of necessary nodes and links, so that communication can be performed efficiently. To achieve the efficient communication, the desirable link utilization is quantified by multiplying a weighing factor p to the length of each of the links selected as the shortest path at Step S26. The weighing factor p is 0<p<1, so that the length of the link is shortened as utilization frequency of the link increases. The shortened links are prioritized when selecting the shortest path at Step S25. The multiplication by the weighing factor p facilitates the ease of utilization of a single link in numerous paths. The weighing factor p can be discretionary set within the range of 0<p<1. However, smaller weighing factor p can facilitate to achieve an object of utilizing a single link for a number of paths as many as possible.

As stated above, the unused nodes and links in the independent paths are eliminated to generate the subgraph in the network model, the weighing factor p is multiplied to the length of each of the links every time each of the links is used as the independent path, the "p"-multiplied length of the links is considered for selecting another independent path, and the network coding methodology is determined utilizing the subgraph. Therefore, necessary nodes and links are included but unnecessary nodes and links are eliminated for every target node and the efficient network coding is attained. Furthermore, data can surely and reliably be transmitted to specific destinations. Moreover, because the redundant and unnecessary communication can be avoided maximally, so that the risk of possible interception can be reduced.

According to an aspect of the present invention, data can surely and reliably be transmitted to specific destinations and the risk of possible interception can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of selecting a network path for a network coding communication using a network model that includes nodes having at least one source node that transmits data, at least two target nodes that receive the data from the source node, and links between the nodes, the method comprising:

initializing a length of each of the links to a predetermined value;
searching for an independent path from the source node to one of the target nodes based on the length of each of the links;
multiplying a predetermined factor to the length of each of the links used in the independent path that is obtained at the searching;
repeating the searching and the multiplying until the searching and the multiplying are performed on all the target nodes;
extracting the links and the nodes of the independent path;
generating a subgraph having the extracted links and nodes; and
selecting the network path based on the subgraph,
wherein a minimum number of independent paths is determined for each of the target nodes and the minimum number is set to a dimension number of the data transmitted by the network coding communication.

2. The method according to claim 1, wherein the length of each of the links is set to one, and the predetermined factor is larger than zero and smaller than one when initializing.

3. A communication system that performs a network coding communication using a network path associated with a network model, the communication system comprising:
a plurality of nodes including at least one source node to transmit data, at least two target nodes that receive the data from the source node, and links between the nodes, at least one node from the plurality of nodes to:
initialize a length of each of the links to a predetermined value;
search for an independent path from the source node to one of the target nodes based on the length of each of the links;
multiply a predetermined factor to the length of each of the links used in the independent path that is obtained at the search for the independent path;
repeat the search for the independent path and the multiplying of the predetermined factor until the search and the multiplying are performed on all the target nodes;
extract the links and the nodes of the independent path;
generate a subgraph with the extracted links and the extracted nodes; and
select the network path based on the subgraph,
wherein a minimum number of independent paths is determined for each of the target nodes and the minimum number is set to a dimension number of the data transmitted by the network coding communication.

4. The communication system according to claim 3, wherein the length of each of the links is set to one, and the predetermined factor is larger than zero and smaller than one when initializing.

5. A non-transitory computer readable storage medium having stored thereon computer executable instructions that when executed by a processor in a communication system cause the communication system to select a network path for a network coding communication using a network model that includes nodes including at least one source node to transmit data, at least two target nodes that receive the data from the source node, and links between the nodes, the executable instructions causing the processor to:
initialize a length of each of the links to a predetermined value;
search for an independent path from the source node to one of the target nodes based on the length of each of the links;

multiply a predetermined factor to the length of each of the links used in the independent path that is obtained at the searching;

repeat the searching and the multiplying until the searching and the multiplying are performed on all the target nodes;

extract the links and the nodes of the independent path;

generate a subgraph with the extracted links and nodes; and select the network path based on the subgraph, wherein a minimum number of independent paths is determined for each of the target nodes and the minimum number is set to a dimension number of the data transmitted by the network coding communication.

6. The non-transitory computer readable storage medium according to claim 5, wherein the length of each of the links is set to one, and the predetermined factor is larger than zero and smaller than one when initializing.

7. The method according to claim 1, wherein the independent path to one of the target nodes does not share any links with other independent paths to the same target node.

* * * * *